United States Patent
Rickmeier, Jr. et al.

[15] 3,683,452
[45] Aug. 15, 1972

[54] HANDLE CONSTRUCTION FOR A BOWL

[72] Inventors: Carl H. Rickmeier, Jr., Sheboygan; Walter Platkus, Glenbeulah, both of Wis.

[73] Assignee: The Vollrath Co., Sheboygan, Wis.

[22] Filed: March 5, 1971

[21] Appl. No.: 121,296

[52] U.S. Cl. ........................................16/126, 220/96
[51] Int. Cl. ..............................................A47b 95/02
[58] Field of Search .....220/96; 150/12; 16/126, 127, 16/113

[56] References Cited

UNITED STATES PATENTS

| 489,173 | 1/1893 | Wilmot | 220/96 |
| 597,217 | 1/1898 | Loery | 16/126 |

*Primary Examiner*—Bobby R. Gay
*Assistant Examiner*—Doris L. Troutman
*Attorney*—Morsell & Morsell

[57] ABSTRACT

A kitchen bowl has a large ring pivotally connected to a side thereof for swinging movement from a loosely suspended position to a raised, horizontal position where ball locks on the ring snap into readily releasable position beneath an annular flange on the bowl to convert the ring into a rigid handle.

10 Claims, 4 Drawing Figures

PATENTED AUG 15 1972 3,683,452

INVENTORS
Carl H. Rickmeier Jr.
Walter Plathus
BY
Morsell & Morsell
ATTORNEYS 3,683,452

HANDLE CONSTRUCTION FOR A BOWL

BACKGROUND OF THE INVENTION

1. Field of the Invention:

The present invention relates to bowls used in households for mixing, serving and storing food items, as well as for other general purposes.

2. Description of the Prior Art:

Heretofore most mixing bowls have been free of handles so that there will be no projections to interfere with rotation in an electric mixer. Thus, permanently projecting, rigid handles are not suitable for this type of utensil. Some mixing bowls have had small, loosely suspended rings on the side suitable for use in hanging the bowl on a wall, but such rings have not been particularly suitable for use as handles.

SUMMARY OF THE INVENTION

The present invention provides, in a utensil having a rim with an outwardly projecting annular flange, a handle pivotally suspended from a location below and adjacent said flange, and locking means on a portion of the handle which is near the utensil and which is positioned to engage beneath the utensil flange, said locking means and flange being shaped to cooperate in locking said handle in a raised, outwardly projecting position where it forms a rigid handle.

It is a general object of the invention to provide a bowl having a member which can be quickly converted from a freely suspended, out-of-the-way position at the side of the bowl to a position where it forms a rigid handle.

A more specific object of the invention is to provide a bowl in which the member is in the form of a ring which can be used as a rigid handle for sure-grip blending or for hanging the bowl on a wall, the arrangement being such that the member can be quickly folded down for space-saving storage.

A more specific object of the invention is to provide a bowl having a handle member mounted for free suspension on a side thereof, there being one or more ball-shaped projections on the handle positioned to snap beneath the bowl flange to detachably lock the handle in a rigid, horizontally projecting position.

With the above and other objects in view, the invention consists of the improved handle construction for bowls, and all of its parts and combinations, as set forth in the claims, and all equivalents thereof.

BRIEF DESCRIPTION OF THE DRAWING

In the accompanying drawing, illustrating one complete embodiment of the preferred form of the invention, in which the same reference numerals designate the same parts in all of the views.

DESCRIPTION OF THE PREFERRED EMBODIMENT

Figures 3, 4:
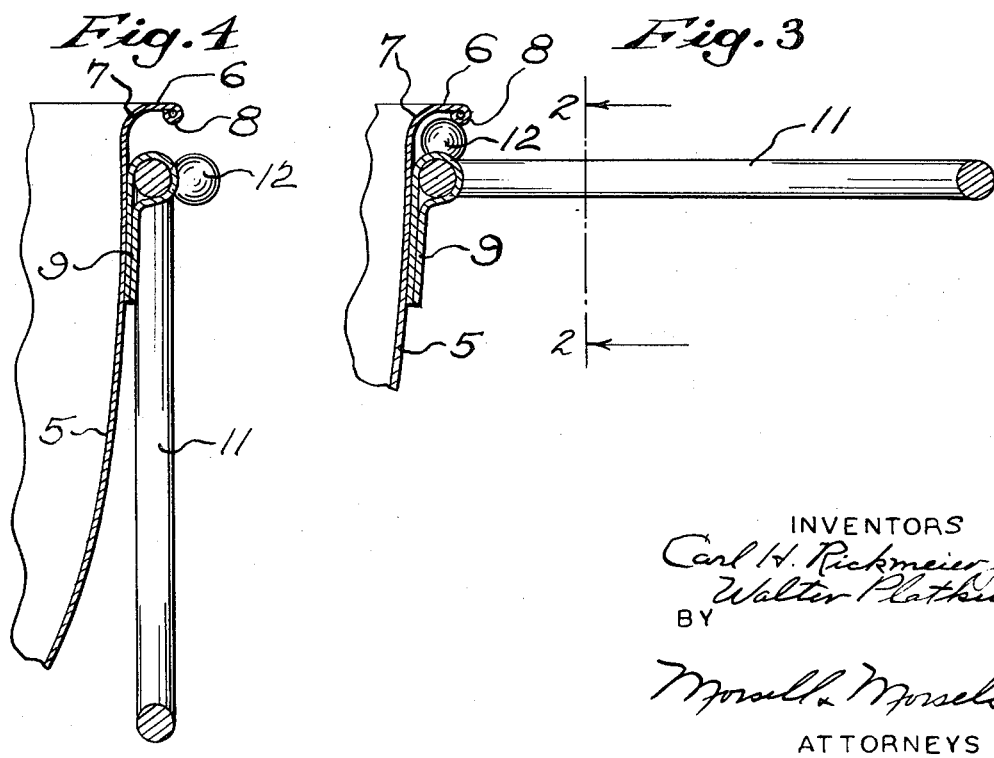
FIG. 3 is a fragmentary sectional view taken on the line 3—3 of FIG. 2.
FIG. 4 is a fragmentary sectional view taken on the line 4—4 of FIG. 1.

Referring more particularly to the drawing, the bowl illustrated is a bowl of a shape suitable for use with an electric mixer or for use in whipping or beating. In the preferred embodiment of the invention the bowl 5 is formed of stainless steel. It may, however, be formed of other metal, or may be formed of other suitable materials such as a suitable type of plastic. The bowl has the usual upper edge rim with an outwardly projecting flange 6. In the case of the circular bowl illustrated, this flange is annular. The flange is preferably bent on a radius 7 and has an inwardly-turned bead 8 at its outer edge which is preferably substantially circular in cross section, as illustrated in FIG. 4.

Welded or otherwise suitably secured to the exterior of a side wall portion is a looped metal band 9 having a generally cylindrical upper end portion 10 forming a horizontal hinge mounting for the handle 11.

Figure 2:
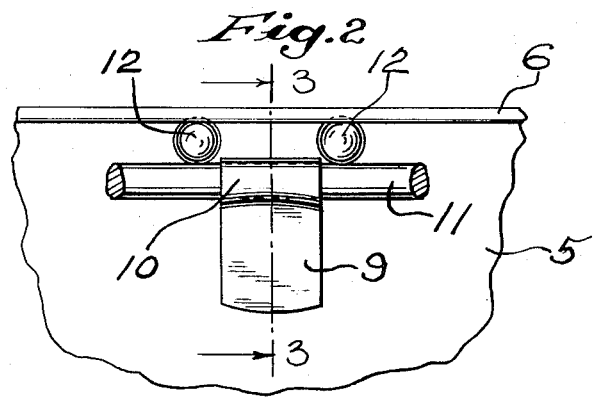
FIG. 2 is a fragmentary side elevational view showing the inner portion of the handle with the latter raised and locked in outwardly projecting position, the view being taken approximately on the line 2—2 of FIG. 3.

While in the preferred form of the invention the handle is in the shape of a ring as illustrated, the projecting portion of the handle may have other shapes, and where the bowl is formed of stainless steel the handle is also preferably formed of stainless steel. Welded to the outer portion of the handle are one or more locking members 12 positioned and sized to coact with the flange 7 and bead 8 thereof in maintaining the handle in the raised position of FIGS. 2 and 3. Thus the flange and its bead form cooperating locking means.

In the preferred embodiment the handle is in the form of a large ring, large enough that it can be gripped within the hand of the user. With this arrangement it is desirable to have the locking members 12 in the form of balls which are welded to the outer side of the ring, one on each side of the hinge member 9. The hinge member is so located on the side of the bowl with respect to the bowl flange 6 and with respect to the diameter of the balls 12 that when the handle is raised from the suspended position of FIG. 4 to the horizontal position, the balls will snap beneath and behind the beads 8 of the flange. With this arrangement the handle is rigidly held in the horizontal, outwardly projecting position. During such swinging movement of the handle the flange 6 of the metal bowl will yield upwardly just enough to allow the balls 12 to snap behind the beads 8. Where the bowl is made of other materials the flange 6 should be sufficiently rigid to hold the handle in upright raised position of FIG. 3 but should also be capable of yielding slightly as the balls snap beneath the flange.

Figure 1:
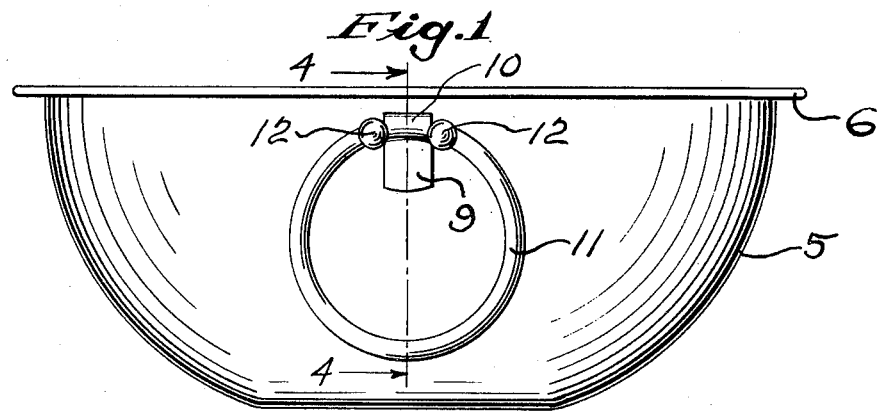
FIG. 1 is a side elevational view of a bowl equipped with the improved handle showing the latter in suspended position.

In use of the bowl, it may be used in an electric mixer with the ring hanging down as in FIGS. 1 and 4 so that it can rotate with the mixer without interference from the handle. However, for use in inserting or removing the bowl from the mixer, the handle may be readily snapped into the raised position of FIG. 3. Also, where ingredients are being whipped or beaten in the bowl, the handle 11, in raised position, provides for a sure grip on the bowl with one hand while such beating is being performed.

When the bowls are not in use the handles may be raised and the bowls hung by the ring on a wall in the pantry or kitchen for the gourmet look. On the other hand, if it is desired to store the bowl in a cupboard with other bowls, the ring may be in the suspended position of FIGS. 1 and 4 for space-saving storage. This is also a convenience when the bowl is being stored in a refrigerator where a projecting handle would occupy too much space.

It is to be understood that I do not desire to be limited to the exact details of construction shown and described, for obvious modifications will occur to a person skilled in the art.

What we claim is:

1. In a utensil having a side wall and having a rim with an outwardly projecting flange, a handle pivotally suspended from a location on said side wall below and adjacent said flange, and locking means on a portion of said handle which is near the utensil positioned to engage beneath said flange when the handle is swung from a suspended to a horizontal position, said flange and locking means being shaped to cooperate in releasably holding said handle in said raised, outwardly projecting position.

2. A utensil as claimed in claim 1 in which the locking means is in the form of a ball of a size to snap beneath said utensil flange.

3. A utensil as claimed in claim 1 in which the handle is in the form of a relatively large ring.

4. A utensil as claimed in claim 3 in which there is locking means on the ring on each side of the pivotal suspension for the ring.

5. A utensil as claimed in claim 4 in which the locking means is in the form of a ball welded on each side of the pivotal suspension for the ring.

6. A utensil as claimed in claim 1 in which the utensil flange is yieldable to lockingly receive the locking means when the handle is raised.

7. A utensil as claimed in claim 1 in which there is a relative yielding movement between the locking means and flange when the handle is being moved to the raised position.

8. A utensil as claimed in claim 1 in which the utensil is a circular metal bowl with a yieldable metal flange.

9. In a bowl having a side wall, a ring-shaped handle pivotally suspended from said side wall, at least one ball locking means on said ring adjacent the pivotal suspension thereof which ball is in an outwardly projecting position when the ring is in suspended position, and cooperating locking means projecting from the side of the bowl above the pivotal suspension for the ring positioned to coact with said ball when the ring is in a raised, outwardly projecting position to releasably hold the ring in said position.

10. A bowl as claimed in claim 9 in which there is a ball on each side of the pivotal suspension for the ring, and in which both balls coact with said cooperating locking means.

* * * * *